(12) United States Patent
Scarbrough

(10) Patent No.: X8768
(45) Date of Patent: Apr. 14, 1835

(54) HULLING RICE, POLISHING

(76) Inventor: William Scarbrough

United States Patent

Patent No.: X8768

William Scarbrough Savannah Ga

Letters Patent

The Schedule referred to in these Letters Patent and making part of the same
Containing a description in the words of the said William Scarbrough himself
of his Improvement in the Cleaning and polishing or burnishing of Rice To all whom these presents shall come Be it known that I William Scar-
brough of the City of Savannah in Chatham County State of Georgia have
invented a new and useful improvement in the Cleansing and polishing
or burnishing of Rice and that the following is a full and exact descrip
-tion thereof. ..

Various & infinite & ingenious as have been the contrivances
which have hitherto been devised and applied to the cleaning of Rice from
the pellicle or Skin under the outer husk and preparing the same for a for-
eign or domestic market no plan hitherto ipayed or tried has in any length
of time effectually answered the desired purpose except that of pounding the
same in Mortars. This was formerly done by hand in Small Mortars but of
late years falling pestles raised by the arms of a Wallower in the Dutch
flax seed oil Cake stamping mill impelled by animal water or steam
power have been advantageously used and in some few instances pes
-tles have been acted on by cranks but in all and every case the rough rice
had in the first instance to be divested of its outer coat or hull by passing it
between revolving rubbers of sand stone or other materials kept sufficient
-ly apart from each other to prevent the breaking or splitting of the grain
in the operation. The cause of the failure of success in all the other modes or
plans heretofore ipayed has in the first instance originated in the incapac
-ity of the materials or substances applied for the purpose to encounter and
sustain the powerful friction of the chaff or outer coat of the grains of rice
And without its agency and assistance (even in the Mortar where it is foun
-ded) the cleaned rice can never be made sufficiently or satisfactorily
bright or pearly for advantageous market. The nutmeg grater or [illegible]

projections in the Conical Cylinders or the best tempered Steel wire similar
to that used for Cotton or Wool Cards are either entirely worn away or smoothed
& polished by the roughness of the Chaff so as to become inoperative in a period
of time, very little exceeding that in which the same effect would be produced
on the same materials by the operation of well tempered files; and when the
smooth surface has once taken place the desired effect in the cleaning of the
rice may in a great measure be considered as at an end. Another but a
subordinate cause of the insufficiency of the modes or plans besides the pestle
and mortar methods, used is in the large proportion of the grains of the rice
which escaped the operation of the first hulling (and might have been removed
by the pounding) but which still retain their outer coats, although they have lost
their roughness, and have even become smoothed by the subsequent operation.
These grains it has been found next to impossible
to separate from the cleaned rice unless by the process of hand picking, the
labour and expense of which would be entirely too great; but notwithstanding
the presence of these uncleaned grains are intrinsically a matter of very
trivial importance still they tend to depreciate the rice in the market
These preliminary remarks have here been
made in order to render more readily comprehensible the system of rice
cleaning now proposed and to impart for the benefit of others the result of
some [illegible] experience. The mode of operation for the cleaning and
preparing of rice as now proposed is after the rough rice as it is here called
or paddy as it is elsewhere called has been hulled in a manner as above
stated and now in common use either to subject it to from 10 to 20 minutes pound-
-ing in the mortars (but this is not deemed essential) and then or at once after
the operation of the hulling to transfer it to another set of rubbers one of which
set at the least shall be of stone. Whether the upper or nether rubber be made to
revolve, (we are speaking of horizontal rubbers) one of these rubbers will be all
the better for a low rim of stone or other material affixed to its periphery
sufficiently high to the periphery of the other stone or rubber to leave a narrow
space or channel around and wide enough to allow the rice or grain
projected by the centrifugal force from between the two planes of the rubbers
to undergo a still further friction upon the inner surface of the said other
-ring.

-[illegible] [illegible] of the rubber and the periphery of the other one. And the same
designated [illegible] may thereby be made accessory or auxiliary towards the
same purpose as the [illegible] of the hulling rubbers or the grinders in flour or other
mills. But it will be very manifest that there must be a depressed or vacant
place upon the circumference of the said outer rim to admit the escape of the
grains of rice into a spout or a hopper leading to one so as to prevent too great
a degree of pressure or compression between the said rim and the periphery of
the runner. With the hulled rice thus to undergo the operation just desig-
-nated must be carefully admixed as the same is placed in the hopper
(perhaps one fourth of chaff to four fourths of rice, but experience must determine
the appropriate quantity according to the condition and quality of the rice)
a considerable proportion of the cleanest and heaviest of the rice chaff which
in the operation will after the [illegible] original roughness is worne down on the
rice be ground up itself similarly to the shorts or bran in wheat or rye.

If the rice in the first operation should not
as it comes out from between the rubbers prove to be satisfactorily bright
or cleaned it must after it has been fanned and winnowed be returned
to the same rubbers with a fresh supply of chaff to undergo again the same
operation but where expedition is desirable, it being understood that after
every operation of the kind fanning and winnowing may be considered as
next to essential, it would be better to have one or more additional sets of
rubbers and the more the surfaces of the rubbers can be increased by deviation
from an horizontal plane of course the same ought to accelerate the op-
-eration by the prolongation or greater duration of the friction which is to
consummate it. After the rice is deemed sufficiently cleaned from the [illegible]
[illegible] pellicles it will then have to undergo the same process as in other mills by
[illegible] screening, to separate the flour, small rice and whole rice as it
is denominated, re fanning or re winnowing, [illegible] or rubbing to divest
the rice of the fine flour adhering and thereby polishing and burnishing of it
and then again fanning of it, and finally packing it into the barrels.

The Rubbers above alluded to have been con-
-sidered as placed horizontally but vertical rubbers as used in the hulling
[illegible] and pearling of barley may be found to answer an equally good purpose

United States Patent

Patent No.: X8768

What I Claim as my own invention and not previously known in the cleaning and preparing of rough rice or paddy by the above described process is the application of Stone by itself, or with wood or any other material with which it (the Stone) can act in combination together with the due and proper ad-mixture of the Chaff to aid and promote the friction necessary and desira-ble for the proposed object Washington City 6th April 1835

Witnesses
Fcyd. Robt Clark
W.H. William Wallis.

Wm Scarbrough

[1530 [illegible]